United States Patent [19]
Yao et al.

[11] Patent Number: 6,013,387
[45] Date of Patent: Jan. 11, 2000

[54] HYDROGEN ABSORBING ALLOY FOR BATTERY APPLICATION

[75] Inventors: Li-Ho Yao, 4th Fl., No. 99-4, Tung-an St., Taipei, Taiwan; Yongchang Huang, Shanghai; Wenhua Liu, Peijing, both of China

[73] Assignee: Li-Ho Yao, Taipei, Taiwan

[21] Appl. No.: 09/102,277

[22] Filed: Jun. 22, 1998

[51] Int. Cl.$^7$ .................................................. H01M 10/34
[52] U.S. Cl. ............................ 429/59; 429/101; 429/223; 429/224; 429/206; 429/216; 204/293; 420/900
[58] Field of Search ................................ 420/900; 429/59, 429/101, 223, 224, 206, 216, 218.2; 204/293

[56] References Cited

U.S. PATENT DOCUMENTS

| | | | |
|---|---|---|---|
| 5,348,820 | 9/1994 | Suga et al. | 429/216 |
| 5,434,022 | 7/1995 | Anani et al. | 429/218 |
| 5,587,254 | 12/1996 | Kojima et al. | 429/206 |
| 5,654,115 | 8/1997 | Hasebe et al. | 420/900 |
| 5,708,349 | 1/1998 | Hasebe et al. | 320/21 |
| 5,738,953 | 4/1998 | Lichtenberg et al. | 420/900 |

FOREIGN PATENT DOCUMENTS

| | | |
|---|---|---|
| 0 383 991 A2 | 8/1990 | European Pat. Off. . |
| 0 451 575 A1 | 10/1991 | European Pat. Off. . |
| 0 666 606 A1 | 8/1995 | European Pat. Off. . |
| 2 003 927 | 3/1979 | United Kingdom . |

OTHER PUBLICATIONS

WPI Abstract Accession No. 98–292499/199826 and JP100102172 A (Toshiba) see WPI abstract. Apr. 21, 1998.
WPI Abstract Accession No. 88–230879/198833 and JP630164161 A (Matsushita) see WPI abstract. Jul. 7, 1988.

*Primary Examiner*—Bruce F. Bell
*Attorney, Agent, or Firm*—Bacon & Thomas

[57] ABSTRACT

A hydrogen absorbing alloy is disclosed for use as the negative electrode in alkaline batteries. The general formula of the alloy is $AB_xM_y$, wherein A is selected from the rare earth element La or a mischmetal thereof; B is selected from the group consisting of Ni, Fe, Mn, Cr, Cu, Co, and mixtures thereof; M is selected from the group consisting of Al, In, Zn, Sn, Ga, Si, Ge, Bi, and mixtures thereof; $4.5 \leq x \leq 5.5$; and $0.3 < y \leq 0.6$. This alloy has a longer cycle life, along with larger capacity and better reactivity.

11 Claims, 5 Drawing Sheets

HYDROGEN ABSORBING ALLOY FOR BATTERY APPLICATION

FIELD OF THE INVENTION

The present invention relates to a hydrogen absorbing alloy used as the negative electrode of an alkaline battery. More particularly, the alloy possesses longer cycle life and better reactivity in alkaline solution than the conventional alloys.

BACKGROUND OF THE INVENTION

Recently hydrogen absorbing alloys used as the negative electrode in alkaline battery have attracted much attention. The alloy absorbs and desorbs hydrogen reversibly, and the absorbed hydrogen is used as an active material. An effectively rechargeable battery using a hydrogen storage compound should have a large amount of capacity, high enough hydrogen diffusion rate to cause a small reaction resistance (overpotential) for high-rate charge/discharge, and low compositional change rate during repeated electrode reaction to prolong its cycle life.

The hydrogen absorbing alloys used in an alkaline battery were conventionally classified into an $AB_2$ type and an $AB_5$ type. The former had larger capacity but was more expensive. From the view of commercialization, the $AB_5$ type would be more suitable. $LaNi_5$ was chosen initially but the cycle life was too short.

To improve the cycle life, many compositions were proposed, such as MmNiCoMiAl system disclosed in JP63-175,339 and JP63-264,869 (1988). It was found that the partial replacement of nickel with Co and Al, as well as the substitution of the lanthanum content with mischmetal (a mixture of rare earth elements such as La, Ce, Pr, and Nd) were very useful in prolonging the cycle life.

Some other elements were added, too. In JP5-284,619 (1993), Zr was added to form an oxide film to prevent the other active elements from being oxidized. In U.S. Pat. No. 5,242,656 (1993), alkali metal was added to relieve the alkali metal ions $M^+$ continuously in charge/discharge process of the alkaline battery, increasing the concentration of MOH within the battery, having the effect of protecting the cathodes and the anodes validly, and resulting in longer cycle life.

The substitution of Al, Zr, etc. was effective in improving the cycle life of the alloy. However, they increased the reaction resistance of the alloy, whereby the overpotential was increased and deteriorated the high-rate charge/discharge characteristics. H. S. Lim et al. reported in the 12th Battery Conference on Applications and Advances (1997) that the cycle life of $LaNi_{4.8}In_{0.2}$ was shorter than that of $LaNi_5$. In U.S. Pat. No. 4,925,748 (1990), In, Ga, etc. were added to raise the overvoltage in the hydrogen gas generation reaction so as to prevent the hydrogen generation in the process of high-rate charge. The atomic ratios of In and Ga were within the range of from 0.02 to 0.1. Nonetheless, the cycle life was not perfect.

On the other hand, to protect steel structures in sea water from being corroded, sacrificial anodes were used in cathode protection systems. Pure Aluminum supports a thin protective oxide film on the surface with an operational potential in sea water as nearly −0.8V (vs. standard hydrogen electrode), as reported in Material Protection 7 (1968) by B. M. Ponchel, which makes it useless as a pure metal in sacrificial anode protection system. However, the addition of very little In, Sn, Ga, Bi, Zn, Cd, Hg, etc. into aluminum alloys can depassivate the oxide film on the aluminum surface. By restraining or preventing the continuous formation of protective oxide film, those additives keep the activity of the aluminum surface with more electronegativity and higher exchange current density for sacrificial anode use. Among them, Al—In, Al—Zn, Al—Sn, Al—Zn—In, Al—Zn—Sn, Al—Zn—Ga, etc. are the most used alloys in sacrificial anodes.

On the contrary, Al added in the widely used alloy $MmNi_{5−(a+b+c)}CO_aMn_bAl_c$, developed by Matsushita Co., Japan, can prevent the above hydrogen absorbing material from corroding by forming a dense oxide film, but the working current of the alloy is sacrificed.

That is to say, there is still difficulty in preparing hydrogen absorbing alloys that are satisfactory in all performances of discharge capacity, cycle life characteristics, and reactivity. By means of proper addition of the other elements, it is possible to enhance exchange current without significant deterioration of cycle life.

OBJECTS AND SUMMARY OF THE INVENTION

An object of the present invention is to solve the mentioned problems in the prior art. Namely, the object of the invention is to provide an excellent hydrogen absorbing alloy used in an alkaline battery that has a long cycle life, along with very good reactivity in alkaline solution. Such alkaline batteries, as is well known to those skilled in the art, include a positive electrode, a negative electrode and electrolyte. When the alloy of the present invention is used in such a battery, it is advantageously applied to the negative electrode. Furthermore, according to one embodiment of the invention, the electrolyte of such a battery includes one or more ions selected from the group consisting of In, Zn, Sn, Ga, Si, Ge and Bi.

To obtain the foregoing object, a hydrogen absorbing alloy having a general formula $AB_xM_y$ is provided. Wherein A is selected from rare earth element La or mischmetal, B is selected from the group consisting of Ni, Fe, Mn, Cr, Cu, Co, and mixtures thereof, M is selected from the group consisting of Al, In, Zn, Sn, Ga, Si, Ge, Bi, and mixtures thereof, where $4.5 \leq x \leq 5.5$, and $0.3 < y \leq 0.6$.

In the above configuration, according to the present invention, Al, In, Zn, Sn, Ga, Si, Ge, and Bi are added to take a role similar to that in a sacrificial anode system. Reboul et al. put forward such a mechanism as "dissolve-redeposition" to explain the effects of indium in the alloys. That is, In, Sn, etc. dissolved in the anodic process will deposit on the surface of the alloy in the cathodic process. The reason for redeposition is that the standard potential of $In(OH)_3/In$ is much more electropositive than aluminum. The effect of tin is attributed to its ability to enter the surface oxide film as $Sn^{4+}$ ions, thereby creating additional cation vacancies (I Gurrappa, Corrosion Prevention & Control, 1997). In other words, those elements in the Al alloy could be deposited on the surface oxide film, thereby activating the alloy.

In, Sn, etc. in the above hydrogen absorbing alloys take the same role as in the sacrificial anodes of aluminum. After several cycles of the charge/discharge process, the electrode made of conventional Mm—Ni hydrogen absorbing materials in alkaline solution will be covered with lanthanum oxide or hydroxide, which seals the hydrogen diffusion path in the alloy and causes a reduction in capacity. However, In(III), Sn(IV), etc. dissolved in the anodic process will deposit on the surface of the alloy because the standard potentials of $In(OH)_3/In$ (−1.0V), $SnO_2^−/Sn$ (−0.79V), and $ZnO_2^-/Zn$ (−1.24V) are more electropositive than the other elements, such as $La(OH)_3/La$ (−2.80V), $Al(OH)_3/Al$ (−2.31V), and $Mn(OH)_2/Mn$ (−1.56V). That means the deposited metal indium is absorbed in the surface film, e.g. aluminum oxide, lanthanum hydroxide, etc., partially destroying the continuity of those inert films and making the film less dense or thick.

Such a film has more active sites and accordingly larger exchange current density with better reactivity. Moreover, when the atomic ratio of the above elements is less than 0.02, the surface film is still continuous enough to prevent the inner elements from being oxidized. Because of the above effect, even after many cycles, the reactivity of the alloy will maintain, as will the capacity of battery. The high-rate charge/discharge characteristic of the alloy can be improved since hydrogen atoms diffuse more readily when the above elements are added. Indium prolongs the cycle life of the alloy. Other elements added will have the same effect as indium. The salts of the above elements added to the electrolyte solution will also have the same effect on the alloy.

DETAILED DESCRIPTION OF THE INVENTION

The present invention will be described in detail with reference to the following examples and the accompanying figures.

EXAMPLE 1

The hydrogen absorbing alloy having the composition of $MmNi_{3.6}Co_{0.7}Mn_{0.4}Al_{0.3}$ (Mm: 65 wt. % La, 25 wt. % Nd, 6 wt. % Pr, and 4 wt. % Ce) was prepared in an arc melting furnace. Next, the alloy was pulverized to 300~400 mesh by absorbing and desorbing hydrogen several times. The resultant powder was then mixed with polyvinyl alcohol (PVA, 1.5 wt. % aqueous solution) to form a paste. The paste was rolled on a sheet of nickel foam, dried, and pressed to be the negative electrode. Thereafter, the exchange current density of the alloy was measured by linear polarization. The counter electrode is the sintered $Ni(OH)_2$ electrode, the reference electrode being the Hg/[6N KOH]/HgO electrode with an electrolyte of 6N KOH aqueous solution. The results are listed in Table 1.

Figure 1:
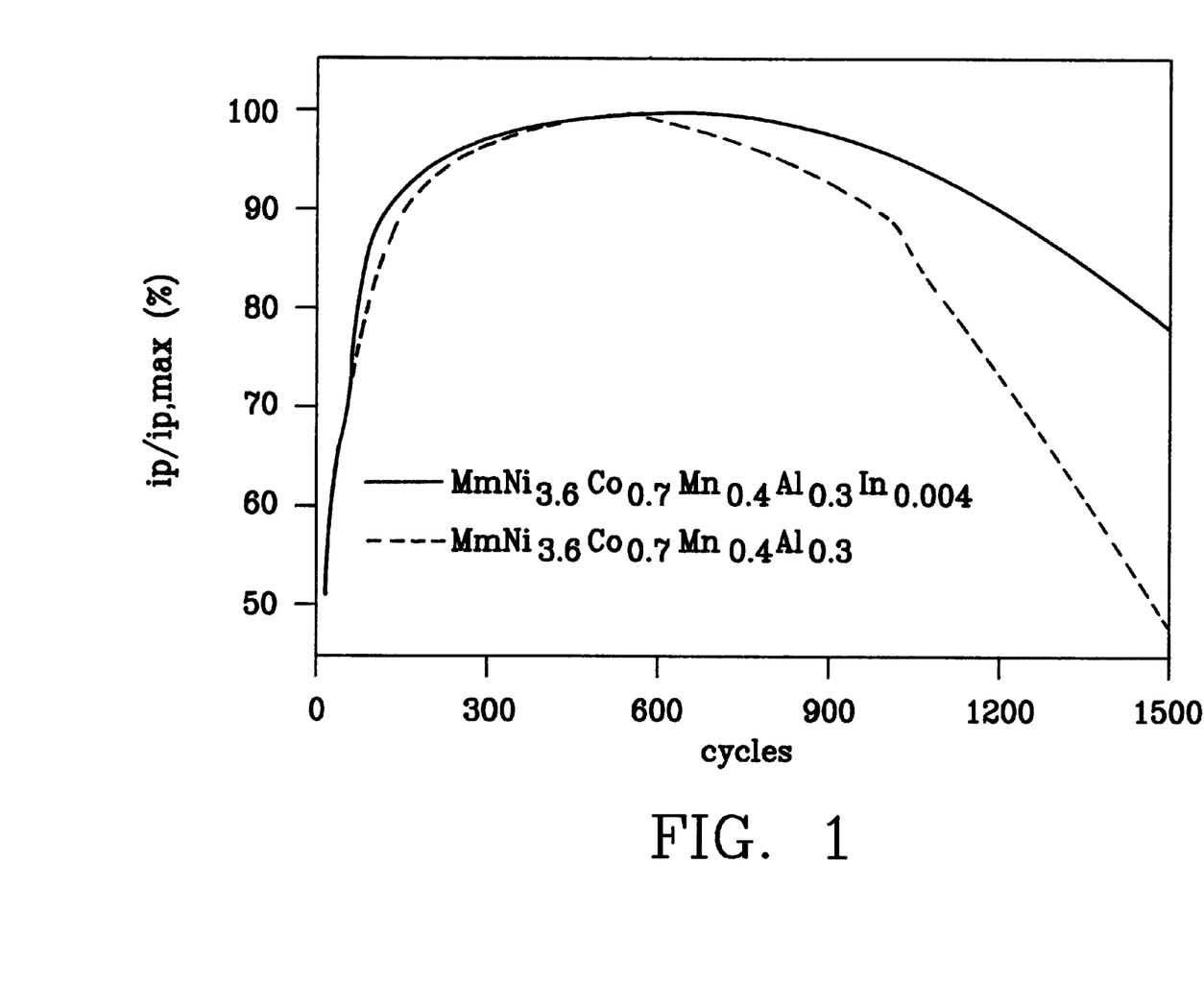
FIG. 1 is the graph of the ratio ($i_p/i_{p,max}$) of the redox peak to the highest peak of the electrode of hydrogen absorbing alloys of $MmNi_{3.6}Co_{0.7}Mn_{0.4}Al_{0.3}In_{0.004}$ and $MmNi_{3.6}Co_{0.7}Mn_{0.4}Al_{0.3}$ versus the number of cycles by microelectrode cyclic voltammetry (scanning speed: 10 mV/sec)

A pill comprising 0.12 g of the above powder mixed with 0.48 g of copper powder was inserted between two sheets of $Ni(OH)_2$ electrodes in a beaker filled with a 6N KOH aqueous solution. Then it was charged and discharged in a current of 100 mA/g repeatedly. To estimate the cycle life, microelectrode cyclic voltammetry was applied. A microdisk electrode of platinum with a small etched cavity filled with the mentioned hydrogen absorbing alloy powder was used as the working electrode. The ratio $i_p/i_{p,max}$ of the redox peak at −600 mV to −700 mV (vs. Hg/HgO electrode) to the highest peak evaluates the activity of the alloy. The higher the ratio ($i_p/i_{p,max}$) remains, the longer the cycle life will be. The results are shown in FIG. 1.

EXAMPLE 2

An electrode was prepared in the same manner as in example 1 except that $MmNi_{3.6}Co_{0.7}Mn_{0.4}Al_{0.3}$ in example 1 was changed to $MmNi_{3.6}Co_{0.7}Mn_{0.4}Al_{0.3}In_{0.004}$. Also, it was tested in the same manner are shown in Table 1 and FIG. 1.

Figure 4A:
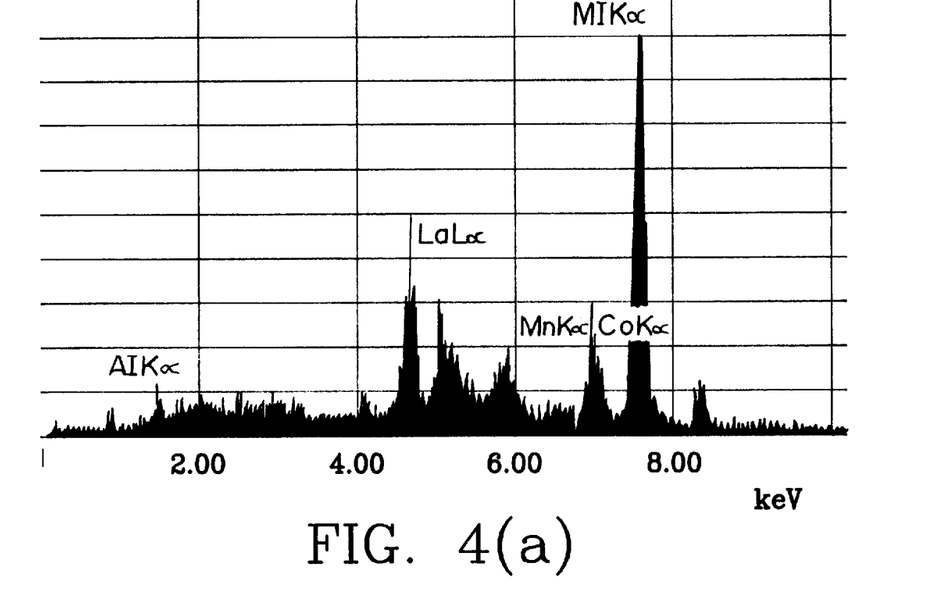
FIGS. 4a and b are the energy dispersive spectrum in X-ray analysis (EDX) of $MmNi_{3.6}Co_{0.7}Mn_{0.4}Al_{0.3}In_{0.004}$, wherein (a) is the spectrum for the alloy before charge/discharge and (b) is that after 12 cycles.
Figure 4B:
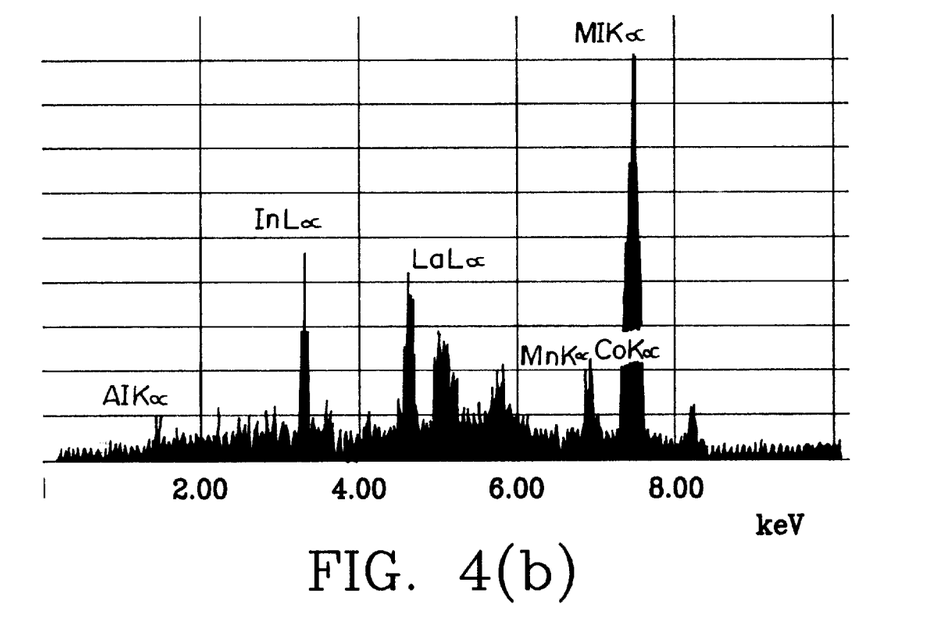

In addition, the electrode before charge/discharge was chemically analyzed by EDX. It was dripped and dried after several charge/discharge cycles, and then analyzed again. The results are shown in FIG. 4.

TABLE 1

|  | Hydrogen absorbing alloy | Capacity (mA/g) | Relative exchange current density (mA/g) |
| --- | --- | --- | --- |
| Example 1 | $MmNi_{3.6}Co_{0.7}Mn_{0.4}Al_{0.3}$ | 275 | 1.0 |
| Example 2 | $MmNi_{3.6}Co_{0.7}Mn_{0.4}Al_{0.3}In_{0.004}$ | 285 | 1.8 |

As shown in Table 1, the hydrogen absorbing alloy with indium addition of Example 2 has a larger capacity than the alloy without the indium addition of Example 1. Besides, the hydrogen absorbing alloy of Example 2 possesses about 80% higher exchange current density than the alloy of Example 1. Therefore, the high-rate charge/discharge characteristic of the alloy is much improved because hydrogen atoms diffuse more rapidly when indium is added.

Referring to FIG. 1, it is apparent that the ratio $i_p/i_{p,max}$ of the hydrogen absorbing alloy without the indium addition of Example 1 drops rapidly after about 1000 cycles, implying electrode deterioration, while the ratio $i_p/i_{p,max}$ of the hydrogen absorbing alloy with the indium addition of Example 2 drops much more slowly even after 1000 cycles. Although the two ratios both reach their maximum after about 400 to 500 cycles, the alloy of Example 2 still maintains about 80% of the ratio $i_p/i_{p,max}$ after 1500 cycles, much higher than the ratio of the alloy of Example 1 which has only about 50%. Because of the effect from the indium addition, even after many cycles, the activity of the alloy will persevere, as will the capacity of batteries. Based on the present invention, the cycle life of the hydrogen absorbing alloy is prolonged.

In addition, the EDX results of the hydrogen absorbing alloy of Example 2 before and after 12 cycles of charge/ discharge are shown in FIGS. 4(a) and 4(b), respectively. In comparison with these two spectra, the appearance of the In(Lα) peak after charge/discharge processes indicates significant indium deposition on the surface of the electrode made of the present alloy, on which the indium concentration is cumulatively higher than that in the bulk of the alloy. This also verifies the "dissolve-redeposition" mechanism aforementioned.

EXAMPLE 3

An electrode was prepared in the same manner as in example 1 except that $MmNi_{3.6}Co_{0.7}Mn_{0.4}Al_{0.3}$ in example 1 was changed to $MmNi_{3.8}Co_{0.7}Mn_{0.4}Zn_{0.01}$. Also, it was tested in the same manner. The results are shown in Table 2 and FIG. 2.

EXAMPLE 4

An electrode was prepared in the same manner as in example 1 except that $MmNi_{3.6}Co_{0.7}Mn_{0.4}Al_{0.3}$ in example 1 was changed to $MmNi_{3.8}Co_{0.7}Al_{0.4}Zn_{0.1}Sn_{0.01}$. Also, it was tested in the same manner. The results are shown in Table 2 and FIG. 2.

EXAMPLE 5

An electrode was prepared in the same manner as in example 1 except that $MmNi_{3.6}Co_{0.7}Mn_{0.4}Al_{0.3}$ in example 1 was changed to $MmNi_{3.8}Co_{0.7}Co_{0.7}Al_{0.4}In_{0.004}$. Also, it was tested in the same manner. The results are shown in Table 2 and FIG. 2.

Figure 5A:
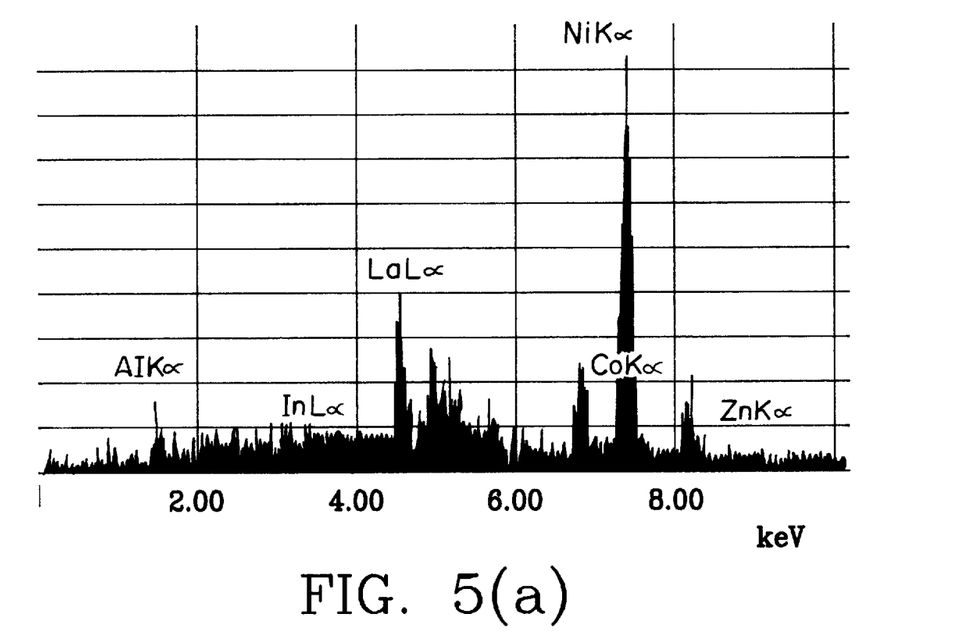
FIGS. 5a and b are the energy dispersive spectrum in X-ray analysis of $MmNi_{3.8}Co_{0.7}Al_{0.4}Zn_{0.1}In_{0.004}$, wherein (a) is the spectrum for the alloy before charge/discharge and (b) is that after 11 cycles.
Figure 5B:
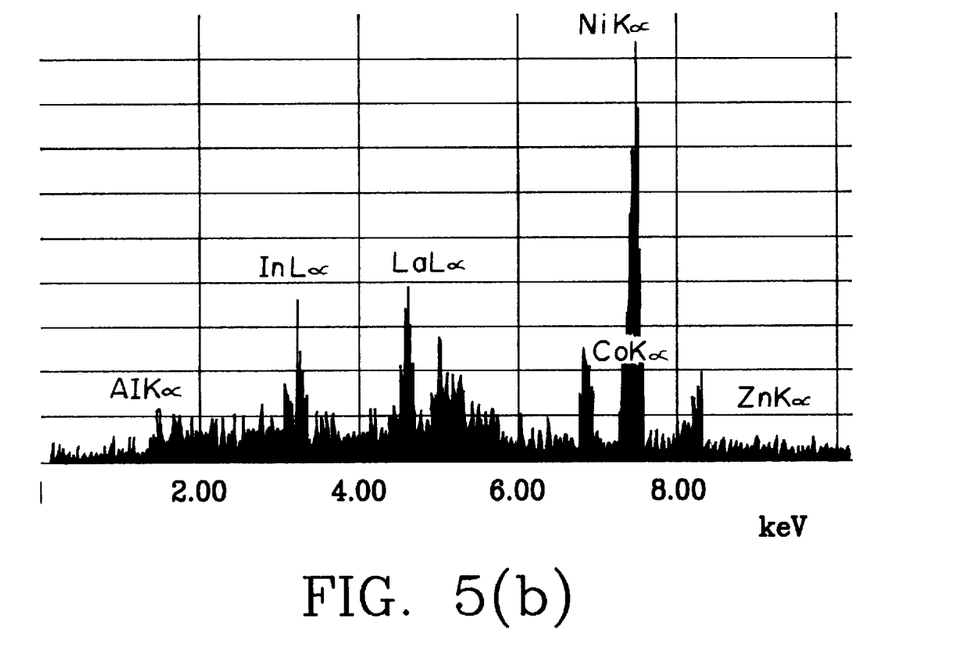

In addition, the electrode before charge/discharge was chemically analyzed by EDX. It was drip-dried after several charge/discharge cycles, and analyzed again. The results are shown in FIGS. 5(a) and 5(b).

TABLE 2

| | Hydrogen absorbing alloy | Capacity (mA/g) | Relative exchange current density (mA/g) |
|---|---|---|---|
| Example 3 | $MmNi_{3.8}Co_{0.7}Al_{0.4}Zn_{0.1}$ | 259 | 1.0 |
| Example 4 | $MmNi_{3.8}Co_{0.7}Al_{0.4}Zn_{0.1}Sn_{0.01}$ | 282 | 1.17 |
| Example 5 | $MmNi_{3.8}Co_{0.7}Al_{0.4}Zn_{0.1}In_{0.004}$ | 260 | 1.29 |

As shown in Table 2, the hydrogen absorbing alloy with the tin addition of Example 4 and the hydrogen absorbing alloy with the indium addition of Example 5 have larger capacities than the alloy without the tin or indium addition of Example 3. Besides, the hydrogen absorbing alloys of Example 4 and 5 possess about 20% to 30% higher exchange current density relative to the alloy of Example 3. Therefore, the high-rate charge/discharge characteristic of the alloy is slightly improved because hydrogen atoms diffuse more rapidly when tin or indium is added.

Figure 2:
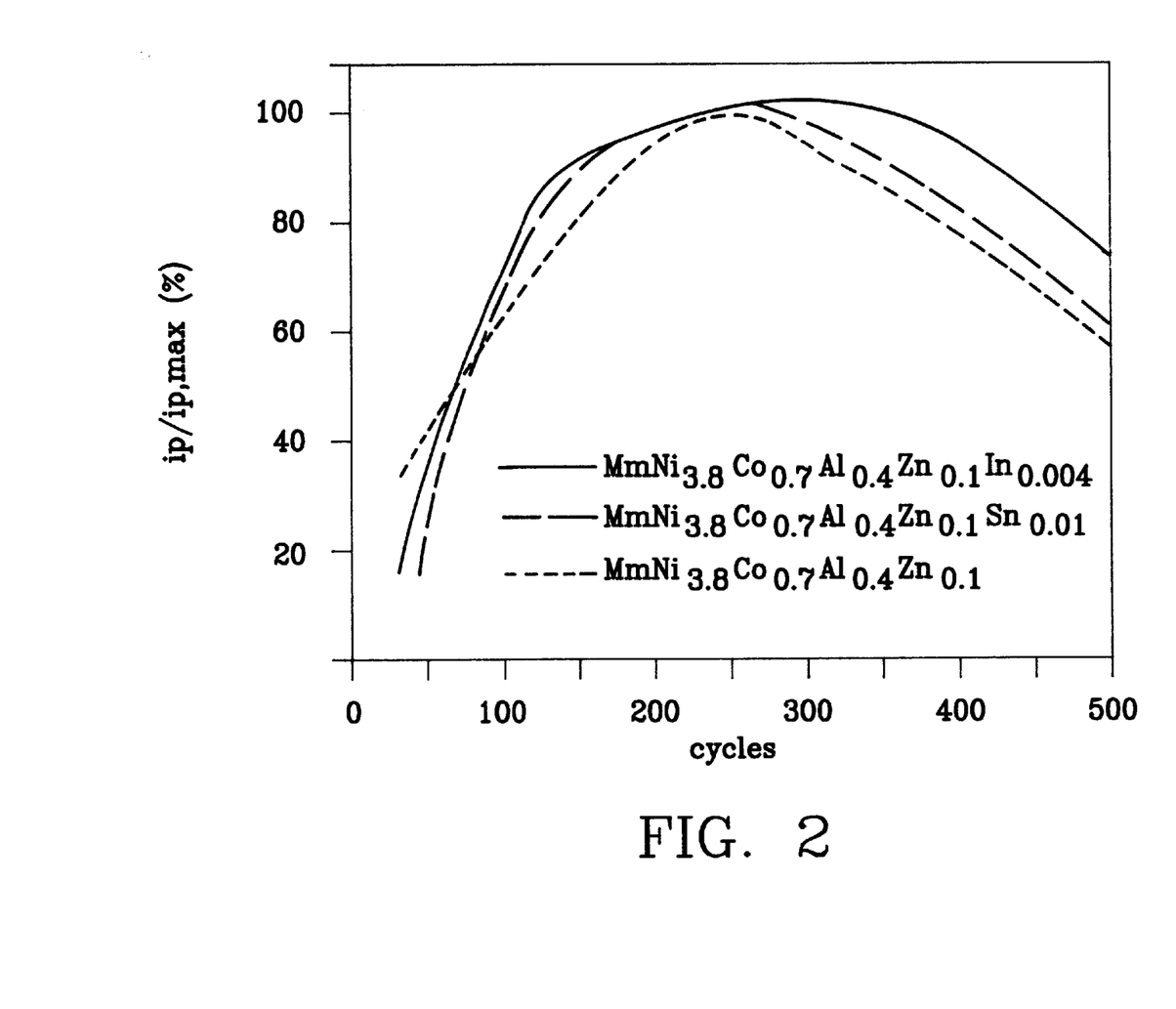
FIG. 2 is the graph of the ratio $i_p/i_{p,max}$ of the electrode of hydrogen absorbing alloys of $MmNi_{3.8}Co_{0.7}Al_{0.4}Zn_{0.1}In_{0.004}$, $MmNi_{3.8}Co_{0.7}Al_{0.4}Zn_{0.1}Sn_{0.01}$, and $MmNi_{3.8}Co_{0.7}Al_{0.4}Zn_{0.1}$ versus the number of cycles by microelectrode cyclic voltammetry (scanning speed: 20 mV/sec)

Referring to FIG. 2, it is apparent that the hydrogen absorbing alloys with the tin or indium addition of Examples 4 and 5 still maintain the ratio $i_p/i_{p,max}$ of about 70% and 60%, respectively, after 500 cycles. On the contrary, the ratio $i_p/i_{p,max}$ of the hydrogen absorbing alloy without the tin or indium addition of Example 3 is always lower than those of Examples 4 and 5 after 100 cycles and below 60% after 500 cycles though the three ratios all reach their maximum after about 200 to 300 cycles. Because of the effect from the tin or indium addition, even after many cycles, the activity of the alloy perseveres, as does the capacity of batteries. Based on the present invention, the cycle life of the hydrogen absorbing alloy is prolonged.

In addition, the EDX results of the hydrogen absorbing alloy of Example 5 before and after 11 cycles of charge/discharge are shown in FIGS. 5(a) and 4(b), respectively. Similar to FIG. 4(b), the appearance of the In(Lα) peak after charge/discharge processes as shown in FIG. 5(b) indicates significant indium deposition on the surface of the electrode made of the present alloy, on which the indium concentration is cumulatively higher than that in the bulk of the alloy. This also verifies the "dissolve-redeposition" mechanism aforementioned in spite of the difference in the alloy compositions of Examples 2 and 5.

EXAMPLE 6

An electrode was prepared in the same manner as in example 1 except that $MmNi_{3.6}Co_{0.7}Mn_{0.4}Al_{0.3}$ in example 1 was changed to $MmNi_{3.6}Co_{0.6}Mn_{0.4}Al_{0.3}Zn_{0.1}$. It was also tested in the same manner. The results are shown in Table 3 and FIG. 3.

EXAMPLE 7

An electrode was prepared in the same manner as in example 1 except that $MmNi_{3.6}Co_{0.7}Mn_{0.4}Al_{0.3}$ in example 1 was changed to $MmNi_{3.6}Co_{0.6}Mn_{0.4}Al_{0.3}Zn_{0.1}Sn_{0.01}$. It was also tested in the same manner. The results are shown in Table 3 and FIG. 3.

EXAMPLE 8

An electrode was prepared in the same manner as in example 1 except that $MmNi_{3.6}Co_{0.7}Mn_{0.4}Al_{0.3}$ in example 1 was changed to $MmNi_{3.6}Co_{0.6}Mn_{0.4}Al_{0.3}Zn_{0.1}In_{0.004}$. It was also tested in the same manner. The results are shown in Table 3 and FIG. 3.

TABLE 3

| | Hydrogen absorbing alloy | Capacity (mA/g) | Relative exchange current density (mA/g) |
|---|---|---|---|
| Example 6 | $MmNi_{3.6}Co_{0.6}Mn_{0.4}Al_{0.3}Zn_{0.1}$ | 270 | 1.0 |
| Example 7 | $MmNi_{3.6}Co_{0.6}Mn_{0.4}Al_{0.3}Zn_{0.1}Sn_{0.01}$ | 288 | 1.23 |
| Example 8 | $MmNi_{3.6}Co_{0.6}Mn_{0.4}Al_{0.3}Zn_{0.1}In_{0.004}$ | 268 | 1.37 |

As shown in Table 3, the hydrogen absorbing alloy with the tin addition of Example 7 and the hydrogen absorbing alloy with the indium addition of Example 8 have larger capacities than the alloy without the tin or indium addition of Example 6. Besides, the hydrogen absorbing alloys of Example 7 and 8 possess about 20% to 40% higher exchange current density than the alloy of Example 6. Therefore, the high-rate charge/discharge characteristic of the alloy is slightly improved because hydrogen atoms diffuse more rapidly when tin or indium is added.

Figure 3:
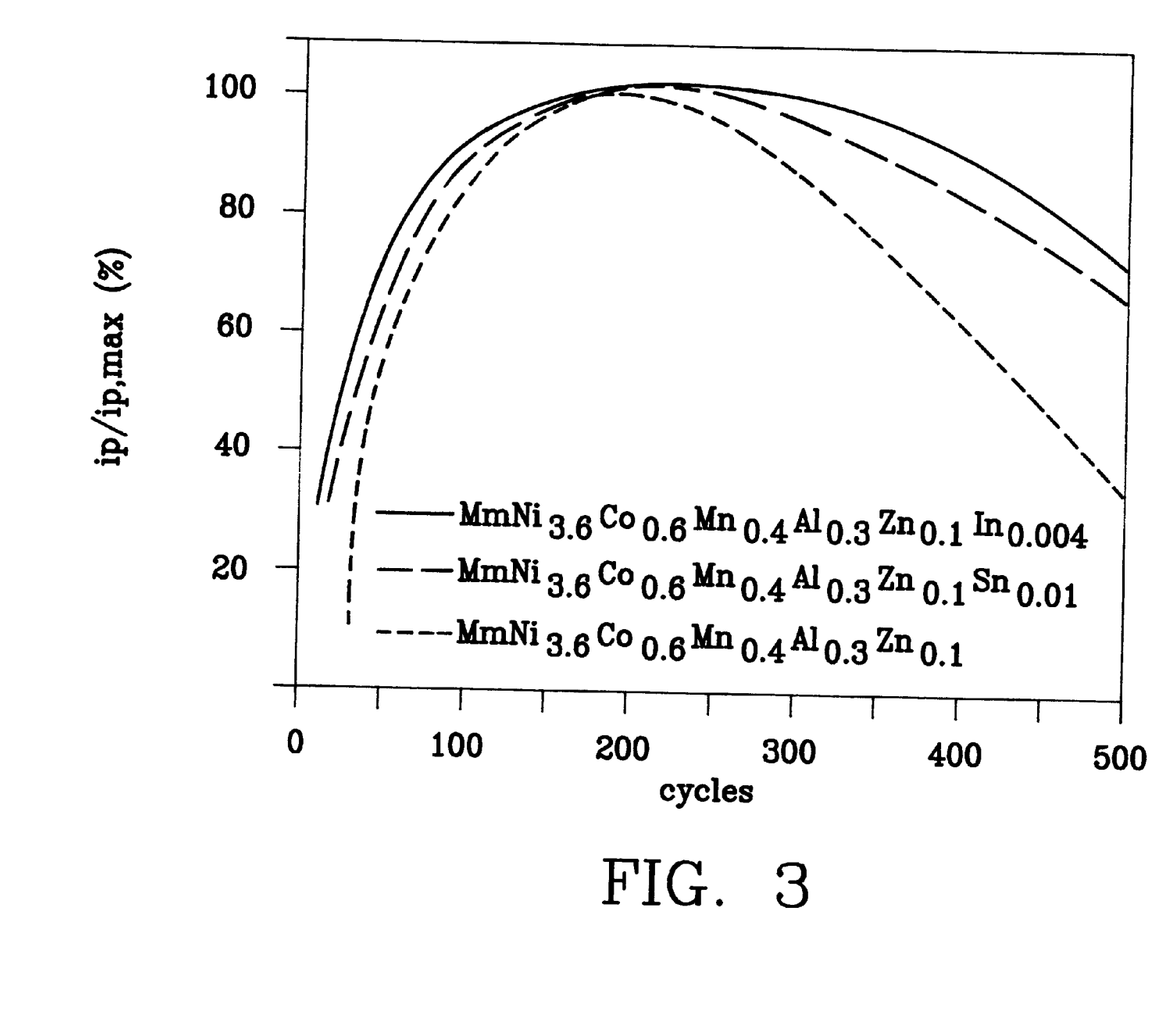
FIG. 3 is the graph of the ratio $i_p/i_{p,max}$ of the electrode of hydrogen absorbing alloys of $MmNi_{3.6}Co_{0.6}Mn_{0.4}Al_{0.3}Zn_{0.1}In_{0.0004}$, $MmNi_{3.6}Co_{0.6}Mn_{0.4}Al_{0.3}Zn_{0.1}Sn_{0.01}$, and $MmNi_{3.6}Co_{0.6}Mn_{0.4}Al_{0.3}Zn_{0.1}$ versus the number of cycles by microelectrode cyclic voltammetry (scanning speed: 20 mV/sec)

Referring to FIG. 3, it is obvious that the ratio $i_p/i_{p,max}$ of the hydrogen absorbing alloy without the tin or indium addition of Example 6 drops rapidly after about 200 cycles, implying electrode deterioration, while the ratios $i_p/i_{p,max}$ of the hydrogen absorbing alloy with the tin or indium addition of Examples 7 and 8 drop much slowly even after 200 cycles. The alloys of Examples 7 and 8 still maintain about 70% of the ratio $i_p/i_{p,max}$ after 500 cycles. On the contrary, the ratio $i_p/i_{p,max}$ of the alloy of Example 6 is always lower than those of Examples 7 and 8 and below 40% after 500 cycles though the three ratios all reach their maximum after about 150 to 250 cycles. Because of the effect from the tin or indium addition, even after many cycles, the activity of the alloy perseveres, as does the capacity of batteries. Based on the present invention, the cycle life of the hydrogen absorbing alloy is prolonged.

Although the alloys with the tin or indium addition according to the aforementioned examples is better than those without the tin or indium addition, it should be appreciated that the conventional alloys based on $AB_5$ type can also be improved with aluminum or zinc addition, regardless of existence of Mn, as illustrated by the alloys without the tin or indium addition in the above examples.

Effects of the Present Invention

As described in the foregoing, in accordance with the present invention, an electrode consisting of a hydrogen absorbing alloy of the present invention as claimed herein provides longer cycle life (as shown in FIGS. 1 to 3) and larger exchange current density and capacity (as shown in Tables 1 to 3). The larger exchange current density implies better reactivity. The enrichment of indium on the surface as shown in FIGS. 4 and 5 confirms the mechanism of "dissolve-redeposition" of indium. The other elements as claimed will have the same effect as in sacrificial anode systems.

People skilled in the art will appreciate that the invention described herein is susceptible to variations and modifications other than those specifically described. It should be understood that the invention includes all such variations and modifications which fall within its spirit and scope.

What is claimed is:

1. A hydrogen absorbing alloy for use in an alkaline storage battery having a composition expressed by a general formula $AB_xM_y$, wherein A is the rare earth element La or a mischmetal;

B is selected from the group consisting of Ni, Fe, Cr, Cu, Co and mixtures thereof;

M is a metal composed of Al and at least one element selected from the group consisting of In, Zn, Sn, Ga, Bi, and mixtures thereof;

$4.5 \leq x \leq 5.5$; and $0.3 < y \leq 0.6$.

2. A hydrogen absorbing alloy for use in an alkaline storage battery having a composition expressed by a general formula $AB_x(Al_aZn_b)_y$, wherein A is the rare earth element La or a mischmetal;

B is selected from the group consisting of Ni, Fe, Cr, Cu, Co, and mixtures thereof;

$4.5 \leq x \leq 5.5$;

$0.3 < y \leq 0.5$;

$0.25 \leq a \leq 0.5$; and $0.01 \leq b < 0.2$.

3. A hydrogen absorbing alloy for use in an alkaline storage battery having a composition expressed by a general formula $AB_x(Al_aIn_b)_y$, wherein A is the rare earth element La or a mischmetal;

B is selected from the group consisting of Ni, Fe, Cr, Cu, Co, and mixtures thereof;

$4.5 \leq x \leq 5.5$;

$0.3 < y \leq 0.5$;

$0.25 \leq a \leq 0.5$; and $0.001 \leq b \leq 0.01$.

4. A hydrogen absorbing alloy for use in an alkaline storage battery having a composition expressed by a general formula $AB_x(Al_aZn_bIn_c)_y$, wherein A is the rare earth element La or a mischmetal;

B is selected from the group consisting of Ni, Fe, Cr, Cu, Co, and mixtures thereof;

$4.5 \leq x \leq 5.5$;

$0.3 < y \leq 0.5$;

$0.25 \leq a \leq 0.5$;

$0.01 \leq b < 0.2$; and $0.001 \leq c \leq 0.01$.

5. A hydrogen absorbing alloy for use in an alkaline storage battery having a composition expressed by a general formula $AB_x(Al_aZn_bSn_c)_y$, wherein A is the rare earth element La or a mischmetal;

B is selected from the group consisting of Ni, Fe, Cr, Cu, Co, and mixtures thereof;

$4.8 \leq x \leq 5.5$;

$0.3 < y \leq 0.6$;

$0.25 \leq a \leq 0.5$;

$0.01 \leq b < 0.2$; and $0.005 \leq c \leq 0.02$.

6. An alkaline storage battery including a positive electrode, a negative electrode and an electrolyte in said battery wherein said negative electrode has a hydrogen absorbing alloy applied thereto; said hydrogen absorbing alloy having a composition expressed by a general formula $AB_xM_y$, wherein A is the rare earth element La or a mischmetal;

B is selected from the group consisting of Ni, Fe, Cr, Cu, Co and mixtures thereof;

M is a metal composed of Al and at least one element selected from the group consisting of In, Zn, Sn, Ga, Bi, and mixtures thereof;

$4.5 \leq x \leq 5.5$; and $0.3 < y \leq 0.6$.

7. The battery of claim 6 wherein one or more ions selected from the group consisting of In, Zn, Ga, Si, Ge, Sn, and Bi are included in said electrolyte.

8. An alkaline storage battery including a negative electrode, a positive electrode, and an electrolyte in said battery, wherein said negative electrode has a hydrogen absorbing alloy applied thereto; said hydrogen absorbing alloy having a composition expressed by the general formula $AB_x(Al_aZn_b)_y$, wherein A is the rare earth element La or a mischmetal;

B is selected from the group consisting of Ni, Fe, Cr, Cu, Co, and mixtures thereof;

$4.5 \leq x \leq 5.5$;

$0.3 < y \leq 0.5$;

$0.25 \leq a \leq 0.5$; and $0.01 \leq b < 0.2$.

9. An alkaline battery including a negative electrode, a positive electrode, and an electrolyte in said battery, wherein said negative electrode has a hydrogen absorbing alloy applied thereto; said hydrogen absorbing alloy having a composition expressed by the general formula $AB_x(Al_aIn_b)_y$, wherein A is the rare earth element La or a mischmetal;

B is selected from the group consisting of Ni, Fe, Cr, Cu, Co, and mixtures thereof;

$4.5 \leq x \leq 5.5$;

$0.3 < y \leq 0.5$;

$0.25 \leq a \leq 0.5$; and $0.001 \leq b \leq 0.01$.

10. An alkaline storage battery including a negative electrode, a positive electrode, and an electrolyte in said battery, wherein said negative electrode has a hydrogen absorbing alloy applied thereto; said hydrogen absorbing alloy having a composition expressed by the general formula $AB_x(Al_aZn_bIn_c)_y$, wherein A is the rare earth element La or a mischmetal;

B is selected from the group consisting of Ni, Fe, Cr, Cu, Co, and mixtures thereof;

$4.5 \leq x \leq 5.5$;
$0.3 < y \leq 0.5$;
$0.25 \leq a \leq 0.5$;
$0.01 \leq b < 0.2$; and
$0.001 \leq c \leq 0.01$.

11. An alkaline storage battery including a negative electrode, a positive electrode, and an electrolyte in said battery, wherein said negative electrode has a hydrogen absorbing alloy applied thereto; said hydrogen absorbing alloy having a composition expressed by the general formula $AB_x(Al_aZn_bSn_c)_y$, wherein A is the rare earth element La or a mischmetal;

B is selected from the group consisting of Ni, Fe, Cr, Cu, Co, and mixtures thereof;

$4.8 \leq x \leq 5.5$;
$0.3 < y \leq 0.6$;
$0.25 \leq a \leq 0.5$;
$0.01 \leq b < 0.2$; and
$0.005 \leq b \leq 0.02$.

* * * * *